United States Patent
Xiong et al.

(10) Patent No.: US 11,488,071 B2
(45) Date of Patent: Nov. 1, 2022

(54) ADVANCED ENSEMBLE LEARNING STRATEGY BASED SEMI-SUPERVISED SOFT SENSING METHOD

(71) Applicant: Jiangnan University, Wuxi (CN)

(72) Inventors: Weili Xiong, Wuxi (CN); Xudong Shi, Wuxi (CN); Bingbin Gu, Wuxi (CN); Xiaoqing Che, Wuxi (CN); Xiaochen Sheng, Wuxi (CN)

(73) Assignee: Jiangnan University, Wuxi (CN)

( * ) Notice: Subject to any disclaimer, the term of this patent is extended or adjusted under 35 U.S.C. 154(b) by 378 days.

(21) Appl. No.: 16/837,428

(22) Filed: Apr. 1, 2020

(65) Prior Publication Data

US 2020/0234199 A1    Jul. 23, 2020

Related U.S. Application Data

(63) Continuation of application No. PCT/CN2018/086128, filed on May 9, 2018.

(51) Int. Cl.
*G06N 20/20* (2019.01)
*G06F 17/16* (2006.01)

(52) U.S. Cl.
CPC .......... *G06N 20/20* (2019.01); *G06F 17/16* (2013.01)

(58) Field of Classification Search
CPC ......... G05B 13/02; G05B 13/04; G06F 15/18; G06F 17/16; G06N 5/02; G06N 5/04;
(Continued)

(56) References Cited

U.S. PATENT DOCUMENTS 7,979,363 B1    7/2011    Minter
2008/0027886 A1*    1/2008    Kowalczyk .......... G06K 9/6277
706/21
(Continued)

FOREIGN PATENT DOCUMENTS

CN    102542126 A    7/2012
CN    102693452 A    9/2012
(Continued)

OTHER PUBLICATIONS

PCT/CN2018/086128 ISA210 Mail Date Jan. 30, 2019.
PCT/CN2018/086128 ISA237 Mail Date Jan. 30, 2019.

*Primary Examiner* — Shawkat M Ali
(74) *Attorney, Agent, or Firm* — IPro, PLLC; Na Xu

(57) ABSTRACT

The present disclosure provides a novel advanced ensemble learning strategy for soft sensor development with semi-supervised model. The main target of the soft sensor is to improve the prediction performance with a limited number of labeled data samples, under the ensemble learning framework. Firstly, in order to improve the prediction accuracy of sub-models for ensemble modeling, a novel sample selection mechanism is established to select the most significantly estimated data samples. Secondly, the Bagging method is employed to both of the labeled and selected data-set, and the two different kinds of datasets are matched based on the Dissimilarity (DISSIM) algorithm. As a result, the proposed method guarantees the diversity and accuracy of the sub-models which are two significant issues of the ensemble learning. In this work, the soft sensor is constructed upon the Gaussian Process Regression (GPR) model.

5 Claims, 5 Drawing Sheets

(58) Field of Classification Search
CPC .......... G06N 7/00; G06N 7/005; G06N 20/00; G06N 20/20
USPC ...................................................... 706/12, 52
See application file for complete search history.

(56) References Cited

U.S. PATENT DOCUMENTS

2012/0143795 A1\* 6/2012 Han ...................... G06F 11/079
 714/E11.029
2017/0061305 A1\* 3/2017 Xiong .................... G06N 5/048

FOREIGN PATENT DOCUMENTS

| CN | 102708294 A | 10/2012 |
| CN | 107451101 A | 12/2017 |
| CN | 107451102 A | 12/2017 |

\* cited by examiner

ADVANCED ENSEMBLE LEARNING STRATEGY BASED SEMI-SUPERVISED SOFT SENSING METHOD

TECHNICAL FIELD

The present disclosure relates to industrial modeling and soft sensing. More particularly, the present disclosure relates to the advanced ensemble learning strategy based semi-supervised soft sensing method.

BACKGROUND

Nowadays, with the growing demand of the high-quality chemical/biological products, a soft sensor has become more and more important to obtain reliable and real-time predictions of the key quality variables in industrial processes. However, it is hard to install hardware sensors to measure those key quality variables, because of the badly circumstance in the industrial environment.

In order to solve the issue that it is hard to measure key quality variables via hardware sensors, soft sensing technology has been paid more and more attentions. With the wide installation of the distributed control system (DCS) which is capable to record a large amount of process data in industrial processes, a variety of data-based soft sensors have been developed. To date, the widely used soft sensing methods include: principal component regression (PCR), partial least square (PLS), artificial neural network (ANN), support vector machine (SVM), Gaussian process regression (GPR), etc.

Nevertheless, the data samples with the output variables are difficult to be acquired, since analyzing quality variables is time-consuming and involves human resource and expensive instruments in the laboratory. As a result, we may need to corporate the soft sensor modeling problem under a very limited number of data samples for both process and quality variables, and a large amount of data samples for only process variables.

SUMMARY

In order to deal with the unbalanced numbers of the training data, this invention is motivated to build an ensemble learning based semi-supervised regression model which incorporates both labeled and unlabeled data samples.

Firstly, in order to improve the diversity performance, not only the Bagging algorithm is implemented upon both of the labeled and estimated dataset to generate sub-models, but also the way to match the labeled sub-datasets and estimated sub-datasets is designed to improve the diversity performance.

The Dissimilarity (DISSIM) algorithm is employed to measure the dissimilarity index of each labeled sub-dataset and estimated sub-dataset pair, and the most dissimilar one can be matched regularly.

Another important issue is how to guarantee the accuracy of the sub-models, which means that significant estimated data samples should be selected carefully into the next ensemble learning.

Therefore, we define an evaluation index to evaluate the important degree of each estimated data samples based on the influence that each estimated data sample worked on the labeled dataset. In this way, the estimated data samples can be selected according to the evaluation index, which means that the significant estimated data samples with additional information will be selected into the selected dataset repairing for the next ensemble step.

In summary, the missing quality variables are estimated through the K-nearest neighborhood method. Then, the important estimated samples are picked out, while the useless samples are discarded, according to the defined evaluation index. The selected samples and labeled samples are divided into several sub data sets by the Bagging algorithm. These two kinds of the sub data sets are combined based on the DISSIM algorithm. Finally, construct sub models for each combined sub data set to make a prediction for the query sample.

This invention is implemented through the following steps:

Step 1: Collect training data set which can be divided as two counterparts: 1) the labeled training data set $D^L = \{X^L \in R^{n_l \times m}, y^L \in R^{n_l \times 1}\}$, 2) the unlabeled training data set $D^U = \{X^U \in R^{n_u \times m}, y^U \in R^{n_u \times 1}\}$;

Then use the K-nearest neighborhood method to estimate the missing quality variable in the unlabeled training data set, and denote the estimated and selected data set as $D^E = \{X^U \in R^{n_l \times m}, y^E \in R^{n_l \times 1}\}$ and $D^S = \{X^S \in R^{n_s \times m}, y^S \in R^{n_s \times 1}\}$, respectively.

where the superscript L, U, E and S, present the labeled, unlabeled, estimated and selected data samples, respectively; and $\{X\}$ and $\{y\}$ are the input (process) and output (quality) variables, respectively; $n_l$, $n_u$, and $n_s$ are the number of the labeled, unlabeled, and selected data samples, respectively; while m is the number of the process variables;

Step 2: Form the selected dataset $D^S = \{X^S \in R^{n_s \times m}, y^S \in R^{n_s \times 1}\}$ according to the labeled training data set and the unlabeled training data set;

where the superscript S means the selected data samples, and $n_s$ is the number of the selected data samples;

Step 3: Employ Bagging algorithm to $D^L$ and $D^S$ respectively, then A labeled sub-datasets $\{D_i^L\}_{i=1}^A$ and A selected sub-datasets $\{D_j^S\}_{j=1}^A$ have been obtained; A is the number of the sub datasets;

Step 4: Match all the sub-datasets, then A matched sub-datasets have been obtained;

Step 5: When a query sample comes, predict its quality variable with the matched sub-datasets via the Gaussian Process Regression (GPR) model;

Optionally, between the step 1 and step 2, said method comprises the step:

Step 1.1: Use Eqs. (1) to (3) to calculate the estimated values of the missing output variables to form the estimated data set; said Eqs. (1) to (3) are termed as self-training algorithm;

$$S(i, j) = \gamma \exp(-\|x_i - x_j\|) + (1 - \gamma)\cos\langle x_i, x_j \rangle \quad (1)$$

$$RS(i, \cdot) = \text{descend}\{S(i, \cdot)\} \quad (2)$$

$$\hat{y}_i = \frac{\sum_{k=1}^{K} RS(i, \cdot)_k y^L_{RS(i,\cdot)_k}}{\sum_{k=1}^{K} RS(i, \cdot)_k} \quad (3)$$

where $\|\cdot\|$ denotes the Euclidean distance, and $\gamma$ is the parameter for the computing the similarity, and $RS(i,\cdot)_k$ represents the k-th element in the rearranged similarity vector $RS(i,\cdot)$, $S(i,\cdot)$ is the similarity vector whose elements present the similarity between the $x_i$ and all the labeled samples, $RS(i,\cdot)$ is a vector that rearranged in descend for the similarity vector S(i,·) and $y_{RS(i,·)_k}^L$ is the quality variable which has the similarity RS(i,·)$_k$ with the unlabeled data sample $x_i$;

Optionally, said step 2 comprises the steps:

Step 2.1: Construct temporary datasets which can be denoted as $D_{temp}(i)=\{[x^L;x_i^U],[y^L;\hat{y}_i^E]\}$. Therefore, we have $n_u$ temporary datasets and they are needed for calculating the evaluation index Q; The definition of the evaluation index Q is given as follow:

$$Q(i)=Q(x_i^U,\hat{y}_i^E)=\Sigma_{x_j\in x^L}(\tilde{y}_{ji}^L-y_j^L)^2 \qquad (4)$$

where $y_j^L$ is the corresponding quality variable of the j-th data sample $x_j$ in the labeled dataset $X^L\in R^{n_l\times m}$, and $\tilde{y}_{ji}^L$ the prediction of $x_j$ in the labeled dataset $X^L\in R^{n_l\times m}$ specified by the GPR model with the i-th temporary dataset $D_{temp}(i)=\{[x^L;x_i^U],[y^L;\hat{y}_i^E]\}$;

Step 2.2: Re-arranged the index Q in a descend order;

$$RQ=\text{descend}(Q)=RQ_1>\ldots>RQ_i>\ldots>RQ_{n_u} \qquad (5)$$

where $RQ_i$ represents the i-th largest value of the element in Q;

Step 2.3: Select the first $n_s$ data samples with the largest Q values to form the selected dataset $D^S=\{X^S\in R^{n_s\times m}, y^S\in R^{n_s\times 1}\}$.

Optionally, said step 3 comprises the following step:

Step 3.1: Calculate the dissimilarity index matrix d whose ij-th element d(i,j) represents the dissimilarity between $D_i^E$ and $D_j^S$;

In Bagging algorithm, the m samples of the l-th sub-dataset are all randomly drawn from the original dataset D, which can be represented as $D_l=\{(x_j,y_j)\}_{j=1}^m$.

Optionally, said step 4 comprises the following steps:

Step 4.1: Search the largest value $d(i_{max})$ of the matrix d and match the i-th$_{max}$ labeled sub-dataset and the j-th$_{max}$ selected sub-dataset;

Step 4.2: Update dissimilarity index matrix d by removing the row $d(i_{max}(\ ))$ and the column $d(\cdot,j_{max}(\ ))$ from the original matrix;

Step 4.3: where matrix d is the dissimilarity index matrix whose ij-th represents the dissimilarity between the i-th labeled sub-dataset and the j-th selected sub-dataset, based on the dissimilarity (DISSIM) algorithm.

Optionally, the procedure of the DISSIM algorithm of said step 4.3 is given as follows:

Consider the following two datasets, $X_1\in R^{n_1\times m}$ and $X_2\in R^{n_2\times m}$, where $n_i$ is the number of samples in dataset $X_i$ and m is the number of variables. The covariance matrices are given by $$R_i=\frac{1}{N_i}X_i^T X_i \qquad (6)$$

The covariance matrix of the mixture of two data sets is given by $$R=\frac{N_1}{N_1+N_2}\begin{bmatrix}X_1\\X_2\end{bmatrix}^T\begin{bmatrix}X_1\\X_2\end{bmatrix}=\frac{N_1}{N_1+N_2}R_1+\frac{N_2}{N_1+N_2}R_2 \qquad (7)$$

Then R can be diagonalized by an orthogonal matrix $P_0$ using eigenvalue decomposition $$P_0^T R P_0=\Lambda \qquad (8)$$

where $\Lambda$ is a diagonal matrix whose diagonal elements are eigenvalues of R.

Then the original data $X_i$ are transformed into $Y_i$.

$$Y_i=\sqrt{\frac{N_i}{N_1+N_2}}X_i P_0 \Lambda^{-\frac{1}{2}}=\sqrt{\frac{N_i}{N_1+N_2}}X_i P \qquad (9)$$

where P is transformation matrix defined as $$P=P_0\Lambda^{-\frac{1}{2}}$$

The covariance matrices of the transformed data are given as $$S_i=\frac{1}{N_i}Y_i^T Y_i=\frac{N_i}{N_1+N_2}P^T\frac{X_i^T X_i}{N_i}P=\frac{N_i}{N_1+N_2}P^T R_i P \qquad (10)$$

Accordingly, the index D is defined for evaluating the dissimilarity of data sets $$D=\text{diss}(X_1,X_2)=\frac{4}{m}\sum_{j=1}^m (\lambda^j-0.5)^2 \qquad (11)$$

where $\lambda^j$ denotes the eigenvalues of the covariance matrix $S_i$;

In this work, only on those eigenvalues whose values are far away from 0.5 are focused on, and the dissimilarity index $\tilde{D}$ is re-defined as follow $$\tilde{D}=\text{diss}(X_1,X_2)=\frac{4}{\tilde{m}}\sum_{j=1}^{\tilde{m}}(\tilde{\lambda}^j-0.5)^2 \qquad (12)$$

where $\tilde{\lambda}^j$ is the j-th element of the set $\tilde{\lambda}^j=\{\text{descend}(|\lambda^j-0.5|)\}$, and $\tilde{m}$ is the number of selected eigenvalues; Unlike the conventional index D measures the whole dissimilar information of the datasets, the new index $\tilde{D}$ relies on the most dissimilar information between two datasets, thus $\tilde{D}$ is more sensitive to different datasets.

Optionally, said step 5 comprises the steps:

Step 5.1: Make the final prediction of the quality variable by combining the sub prediction results, whose calculating method is given as follow:

$$\hat{y}_{final}=\sum_{i=1}^A \frac{1}{A}\hat{y}_i. \qquad (13)$$

Optionally, the Gaussian Process Regression model of said step 5 is described as follows:

Consider a training dataset $X\in R^{n\times m}$ and $y\in R^{n\times 1}$, where $\{x_i\in R^m\}_{i=1}^n$ is the input data with m dimensions, and $\{y_i\in R\}_{i=1}^n$ is the output data; The aim of a regression model is to find a functional relationship $y=f(x|\theta)+\varepsilon$ between input and output; Particularly, the Gaussian process regression model assumes that the regression function with zero-mean Gaussian prior distribution; The description of the function is given as follow $$y=\{f(x_1),f(x_2),\ldots,f(x)\}\sim GP(0,K) \qquad (14)$$

where K is the covariance matrix whose ij-th element is $k_{ij}=k(x_i,x_j)$, and in this paper, the kernel function $k(\cdot)$ is the commonly used squared-exponential covariance function, which is defined as follow $$k(x_i, x_j) = \sigma_f^2 \exp\left\{\frac{(x_i-x_j)^T(x_i-x_j)}{-2l^2}\right\} + \delta_{ij}\sigma_n^2 \qquad (15)$$

where $\delta_{ij}=1$ only when i=j, otherwise $\delta_{ij}=0$; l is length-scale; and $\sigma_f^2$ and $\sigma_n^2$ are terms as signal and noise variance, respectively; An appropriate hyper-parameter set $\Theta=[\sigma_n^2, \sigma_f^2, l]$ is vital for a GPR model to make an accurate prediction about the output variable; To determine the optimal value of the hyper-parameter set, the following likelihood function should be maximized in the training process $$L = -\frac{n}{2}\log(2\pi) - \frac{1}{2}\log(|K|) - \frac{1}{2}y^T K^{-1} y \qquad (16)$$

Conjugate gradient method is used to obtain the closed solution for the above maximizing problem; An alternative way to determine the optimal value is to employ the sampling methods such as Markov chain Monte Carlo (MCMC) method, which draws samples to approximate the poster distribution of the hyper-parameters;

Once we get the optimal hyper-parameter set, the GPR model is available to make a prediction about the distribution of $y_{new}$ corresponding for $x_{new}$; When a query data sample $x_{new}$ comes, according to the property of the multivariate Gaussian distribution, the posterior distribution of the output, namely $(y_{new}|X,y,x_{new}) \sim N(\mu(y_{new}),\sigma^2(y_{new}))$ can be identified, where $\mu(y_{new})$ and $\sigma^2(y_{new})$ is the mean and variance of the poster distribution, respectively;

They can be calculated as follows $$\mu(y_{new})=k^T(x_{new},X)K^{-1}y \qquad (17)$$

$$\sigma^2(y_{new})=k(x_{new},x_{new})-k^T(x_{new},X)K^{-1}k(x_{new},X) \qquad (18)$$

where $k(x_{new},X)=[k(x_{new},x_1),k(x_{new},x_2), \ldots, k(x_{new},x_n)]^T$; Finally, take the expectation $\mu(y_{new})$ of the posterior distribution as the prediction result about the output variable of the query data sample $x_{new}$.

Optionally, the above advanced ensemble learning strategy based semi-supervised soft sensing method is characterized by improving the prediction performance with a limited number of labeled data samples, under the ensemble learning framework, and the improved prediction performance can be obtained.

DETAILED DESCRIPTION

Example 1

Figure 1:
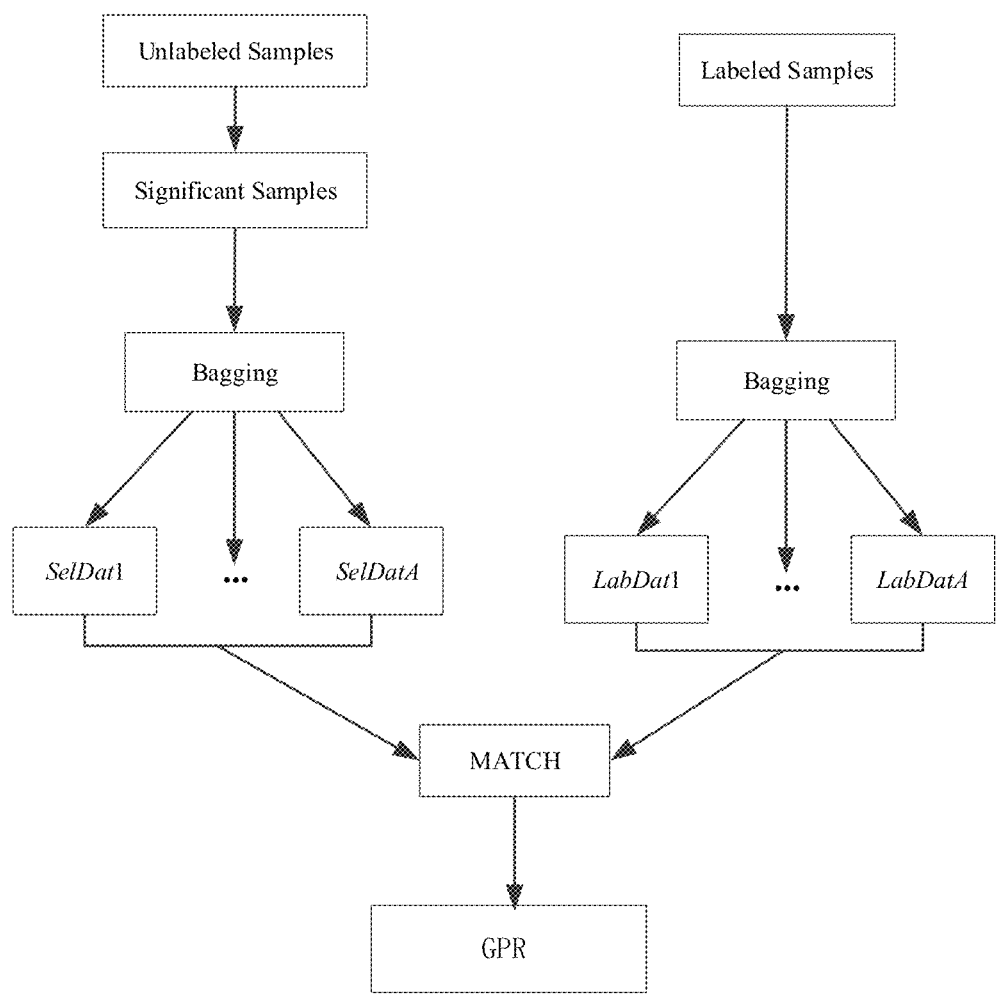
FIG. 1 shows the modeling steps of the advanced ensemble learning strategy based semi-supervised soft sensing method in example 1.

Based on FIG. 1, the detailed illustration of the advanced ensemble learning strategy based semi-supervised soft sensing method is given.

Step 1: Collect training data set which can be divided as two counterparts: 1) the labeled training data set $D^L=\{X^L \in R^{n_l \times m}, y^L \in R^{n_l \times 1}\}$, 2) the unlabeled training data set $D^U=\{X^U \in R^{n_u \times m}, y^U \in R^{n_u \times 1}\}$;

Then use self-training method to estimate the missing quality variable in the unlabeled training data set, and denote the estimated and selected data set as $D^E=\{X^U \in R^{n_l \times m}, y^E \in R^{n_l \times 1}\}$ and $D^S=\{X^S \in R^{n_s \times m}, y_S \in R^{n_s \times 1}\}$, respectively.

where the superscript L, U, E and S, present the labeled, unlabeled, estimated and selected data samples, respectively; and {X} and {y} are the input (process) and output (quality) variables, respectively; $n_l, n_u$ and $n_s$ are the number of the labeled, unlabeled, and selected data samples, respectively; while m is the number of the process variables;

Step 2: Form the selected dataset $D^S=\{X^S \in R^{n_s \times m}, y^S \in R^{n_s \times 1}\}$ according to the labeled training data set and the unlabeled training data set;

where the superscript S means the selected data samples, and $n_s$ is the number of the selected data samples;

Step 3: Employ Bagging algorithm to $D^L$ and $D^S$ respectively, then A labeled sub-datasets $\{D_i^L\}_{i=1}^A$ and A selected sub-datasets $\{D_j^S\}_{j=1}^A$ have been obtained; A is the number of the sub datasets;

Step 4: Match all the sub-datasets, then A matched sub-datasets have been obtained;

Step 5: When a query sample comes, predict its quality variable with the matched sub-datasets via the Gaussian Process Regression (GPR) model.

Example 2

Based on FIG. 1, the detailed illustration of the advanced ensemble learning strategy based semi-supervised soft sensing method is given.

Figure 2:
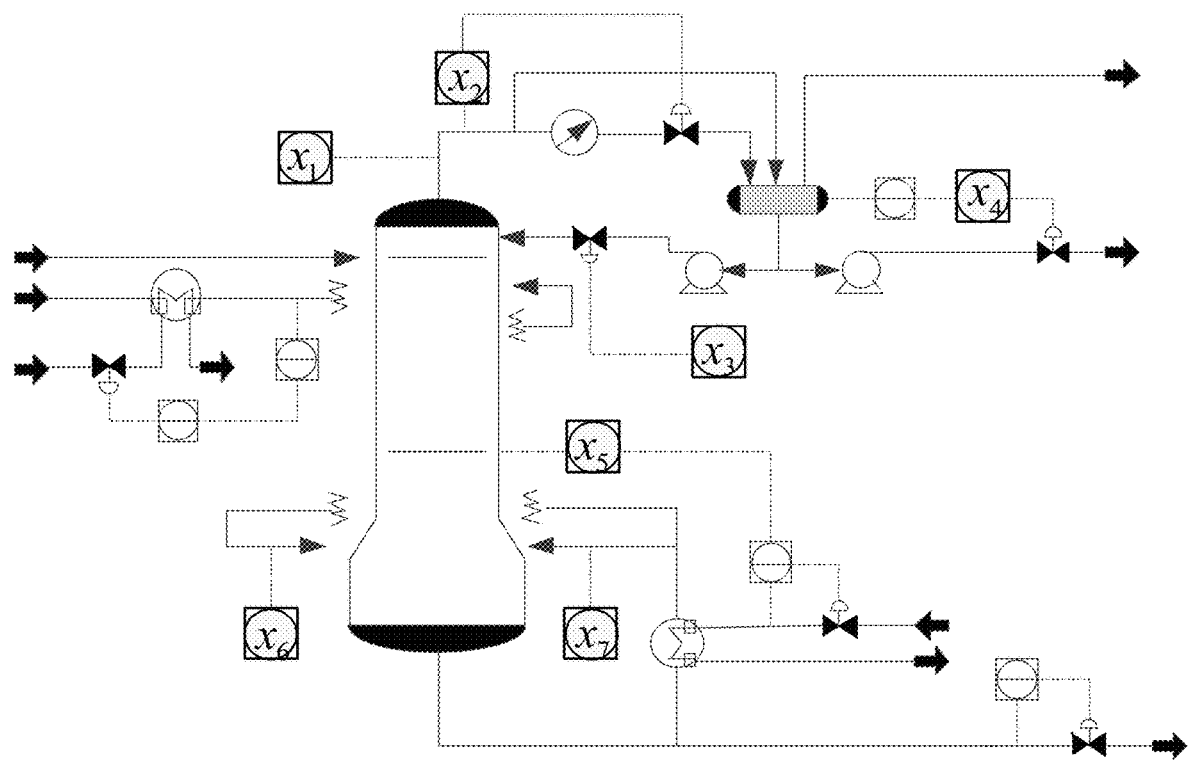
FIG. 2 shows the block diagram of the debutanizer column process.
Figure 3:
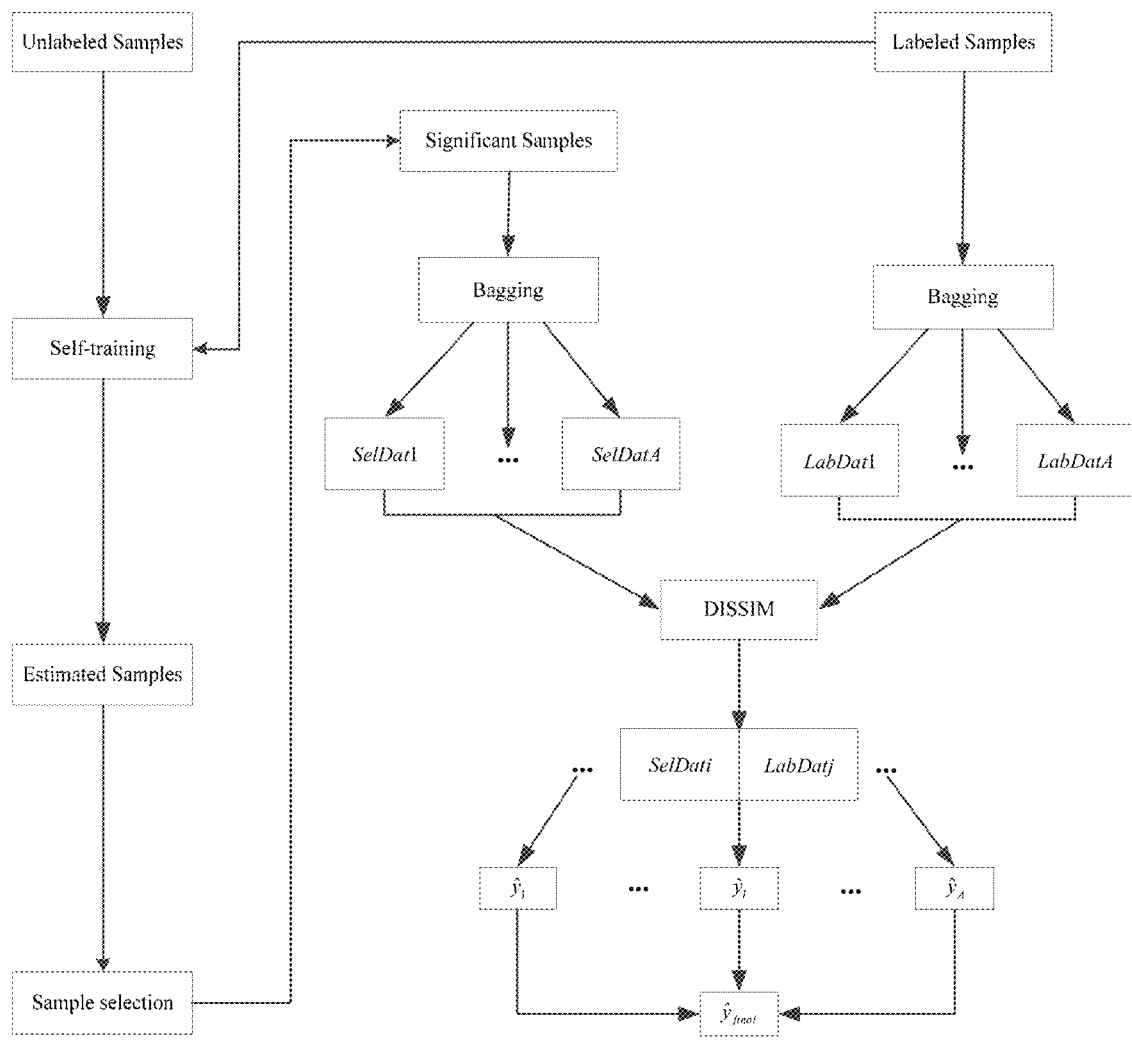
FIG. 3 shows the modeling steps of the advanced ensemble learning strategy based semi-supervised soft sensing method.

The debutanizer column process is utilized, and the soft sensors are designed for the butane content. The block diagram of the debutanizer column process is demonstrated in FIG. 2. In this process, the content of butane in the bottom of the column is the primary variable which should be predicted in real-time. Seven hardware sensors which are marked with grey circles in FIG. 2, are installed to obtain secondary variables, the explanations of which are presented in Table 1.

TABLE 1

| Secondary variable | Explanation | Secondary variable | Explanation |
| --- | --- | --- | --- |
| $x_1$ | Top temperature | $x_5$ | 6th tray temperature |
| $x_2$ | Top pressure | $x_6$ | Bottom temperature I |
| $x_3$ | Reflux flow | $x_7$ | Bottom temperature II |
| $x_4$ | Flow to next process | | |

Step 1: Collect training data set which can be divided as two counterparts:

1) the labeled training data set $D^L=\{X^L \in R^{n_l \times m}, y^L \in R^{n_l \times 1}\}$;
2) the unlabeled training data set $D^U=\{X^U \in R^{n_u \times m}, y^U \in R^{n_u \times 1}\}$.

Then use self-training method to estimate the missing quality variable in the unlabeled training data set, and denote the estimated and selected data set as $D^E=\{X^U \in R^{n_l \times m}, y^E \in R^{n_l \times 1}\}$ and $D^S=\{X^S \in R^{n_s \times m}, y^S \in R^{n_s \times 1}\}$, respectively.

where the superscript L, U, E and S present the labeled, unlabeled, estimated and selected data samples, respectively; and $\{X\}$ and $\{y\}$ are the input (process) and output (quality) variables, respectively; $n_l$ and $n_u$ are the number of the labeled and unlabeled data samples, respectively; while m is the number of the process variables.

Then use Eqs. (1) to (3) to calculate the estimated values of the missing output variables to form the estimated data set, Eqs. (1) to (3) are termed as self-training algorithm.

$$S(i, j) = \gamma \exp(-\|x_i - x_j\|) + (1 - \gamma)\cos\langle x_i, x_j \rangle \quad (1)$$

$$RS(i, \cdot) = \text{descend}\{S(i, \cdot)\} \quad (2)$$

$$\hat{y}_i = \frac{\sum_{k=1}^{K} RS(i, \cdot)_k y_{RS(i,\cdot)_k}^L}{\sum_{k=1}^{K} RS(i, \cdot)_k} \quad (3)$$

where $\|\cdot\|$ denotes the Euclidean distance, and $\gamma$ is the parameter for the computing the similarity, and $RS(i,\cdot)_k$ represents the k-th element in the rearranged similarity vector $RS(i,\cdot)$, and $y_{RS(i,\cdot)_k}^L$ is the quality variable which has the similarity $RS(i,\cdot)_k$ with the unlabeled data sample $x_i$.

Step 2: Then construct temporary datasets which can be denoted as $D_{temp}(i)=\{[x^L;x_i^U],[y^L;\hat{y}_i^E]\}$. Therefore, we have $n_u$ temporary datasets and they are needed for calculating the evaluation index Q. The definition of the evaluation index Q is given as follow $$Q(i)=Q(x_i^U, \hat{y}_i^E)=\Sigma_{x_j \in X^L}(\tilde{y}_j^L - y_j^L)^2 \quad (4)$$

where $y_j^L$ is the corresponding quality variable of the j-th data sample $x_j$ in the labeled dataset $X^L \in R^{n_l \times m}$, and $\tilde{y}_j^L$ is the prediction of $x_j$ specified by the GPR model with the i-th temporary dataset $D_{temp}(i)$ $\{[x^L;x_i^U],[y^L;\hat{y}_i^E]\}$.

Re-arranged the index Q in a descend order $$RQ=\text{descend}(Q)=RQ_1> \ldots >RQ_i> \ldots >RQ_{n_u} \quad (5)$$

where $RQ_i$ represents the i-th largest value of the element in Q.

Select the first $n_s$ data samples with the largest Q values to form the selected dataset $D^S=\{X^S \in R^{n_s \times m}, y^S \in R^{n_s \times 1}\}$.

Step 3: Employ Bagging algorithm to $D^L$ and $D^S$ respectively, then A labeled sub-datasets $\{D_i^L\}_{i=1}^A$ and A selected sub-datasets $\{D_j^S\}_{j=1}^A$ have been obtained. Calculate the dissimilarity index matrix d whose ij-th element d(i,j) represents the dissimilarity between $D_i^E$ and $D_j^S$.

In Bagging algorithm, the m samples of the l-th sub-dataset are all randomly drawn from the original dataset D, which can be represented as $D_l=\{(x_j,y_j)\}_{j=1}^m$.

Step 4: Repeat this step until all the sub-datasets are matched. Search the largest value $d(i_{max})$ of the matrix d and match the $i$-th$_{max}$ labeled sub-dataset and the $j$-th$_{max}$ selected sub-dataset. Then update dissimilarity index matrix d by removing the row $d(i_{max}(\ ))$ and the column $d(\cdot,j_{max}(\ ))$ from the original matrix.

where matrix d is the dissimilarity index matrix whose ij-th represents the dissimilarity between the i-th labeled sub-dataset and the j-th selected sub-dataset, based on the dissimilarity (DISSIM) algorithm.

The procedure of the DISSIM algorithm is given as follows:

Consider the following two datasets, $X_1 \in R^{n_1 \times m}$ and $X_2 \in R^{n_2 \times m}$, where $n_i$ is the number of samples in dataset $X_i$ and m is the number of variables. The covariance matrices are given by $$R_i = \frac{1}{N_i} X_i^T X_i \quad (6)$$

The covariance matrix of the mixture of two data sets is given by $$R = \frac{N_1}{N_1+N_2}\begin{bmatrix} X_1 \\ X_2 \end{bmatrix}^T \begin{bmatrix} X_1 \\ X_2 \end{bmatrix} = \frac{N_1}{N_1+N_2}R_1 + \frac{N_2}{N_1+N_2}R_2 \quad (7)$$

Then R can be diagonalized by an orthogonal matrix $P_0$ using eigenvalue decomposition $$P_0^T R P_0 = \Lambda \quad (8)$$

where $\Lambda$ is a diagonal matrix whose diagonal elements are eigenvalues of R.

Then the original data $X_i$ are transformed into $Y_i$ $$Y_i = \sqrt{\frac{N_i}{N_1+N_2}} X_i P_0 \Lambda^{-\frac{1}{2}} = \sqrt{\frac{N_i}{N_1+N_2}} X_i P \quad (9)$$

where P is transformation matrix defined as $$P = P_0 \Lambda^{-\frac{1}{2}}$$

The covariance matrices of the transformed data are given as $$S_i = \frac{1}{N_i} Y_i^T Y_i = \frac{N_i}{N_1+N_2} P^T \frac{X_i^T X_i}{N_i} P = \frac{N_i}{N_1+N_2} P^T R_i P \quad (10)$$

Accordingly, the index D is defined for evaluating the dissimilarity of data sets $$D = diss(X_1, X_2) = \frac{4}{m}\sum_{j=1}^{m}(\lambda^j - 0.5)^2 \quad (11)$$

where $\lambda^j$ denotes the eigenvalues of the covariance matrix $S_i$.

In this work, only on those eigenvalues whose value is far away from 0.5 is focused on, and the dissimilarity index $\tilde{D}$ is re-defined as follow $$\tilde{D} = diss(X_1, X_2) = \frac{4}{\tilde{m}}\sum_{j=1}^{\tilde{m}}(\tilde{\lambda}^j - 0.5)^2 \quad (12)$$

where $\tilde{\lambda}^j$ is the j-th element of the set $\tilde{\lambda}^j=\{\text{descend}(|\lambda^j-0.5|)\}$, and $\tilde{m}$ is the number of selected eigenvalues. Unlike the conventional index D measures the whole dissimilar information of the datasets, the new index $\tilde{D}$ relies on the most dissimilar information between two datasets, thus $\tilde{D}$ is more sensitive to differentiate datasets.

Step 5: Based on the above steps, the A sub-datasets have been obtained. When a query sample comes, predict its quality variable with the sub-datasets via the Gaussian Process Regression (GPR) model. Make the final prediction of the quality variable by combining the sub prediction results, whose calculating method is given as follow $$\hat{y}_{final} = \sum_{i=1}^{A} \frac{1}{A} \hat{y}_i \quad (13)$$

The Gaussian Process Regression model is described as follows:

Consider a training dataset $X \in R^{n \times m}$ and $y \in R^{n \times 1}$, where $\{x_i \in R^m\}_{i=1}^n$ is the input data with m dimensions, and $\{y_i \in R\}_{i=1}^n$ is the output data. The aim of a regression model is to find a functional relationship $y=f(x|\theta)+\varepsilon$ between input and output. Particularly, the Gaussian process regression model assumes that the regression function with zero-mean Gaussian prior distribution. The description of the function is given as follows $$y=\{f(x_1), f(x_2), \ldots, f(x_n)\} \sim GP(0, K) \quad (14)$$

where K is the covariance matrix whose ij-th element is $k_{ij}=k(x_i,x_j)$, and in this paper, the kernel function $k(\cdot)$ is the commonly used squared-exponential covariance function, which is defined as follow $$k(x_i, x_j) = \sigma_f^2 \exp\left\{\frac{(x_i-x_j)^T(x_i-x_j)}{-2l^2}\right\} + \delta_{ij}\sigma_n^2 \quad (15)$$

where $\delta_{ij}=1$ only when $i=j$, otherwise $\delta_{ij}=0$; l is length-scale; and $\sigma_f^2$ and $\sigma_n^2$ are terms as signal and noise variance, respectively. An appropriate hyper-parameter set $\Theta=[\sigma_n^2, \sigma_f^2, l]$ is vital for a GPR model to make an accurate prediction about the output variable. To determine the optimal value of the hyper-parameter set, the following likelihood function should be maximized in the training process $$L = -\frac{n}{2}\log(2\pi) - \frac{1}{2}\log(|K|) - \frac{1}{2}y^T K^{-1} y \quad (16)$$

Conjugate gradient method is used to obtain the closed solution for the above maximizing problem. An alternative way to determine the optimal value is to employ the sampling methods such as Markov chain Monte Carlo (MCMC) method, which draws samples to approximate the poster distribution of the hyper-parameters.

Once we get the optimal hyper-parameter set, the GPR model is available to make a prediction about the distribution of $y_{new}$ corresponding for $x_{new}$. When a query data sample $x_{new}$ comes, according to the property of the multivariate Gaussian distribution, the posterior distribution of the output, namely $(y_{new}|X,y,x_{new}) \sim N(\mu(y_{new}), \sigma^2(y_{new}))$ can be identified, where $\mu^*y_{new})$ and $\sigma^2(y_{new})$ is the mean and variance of the poster distribution, respectively, which can be calculated as follows $$\mu(y_{new}) = k^T(x_{new}, X) K^{-1} y \quad (17)$$

$$\sigma^2(y_{new}) = k(x_{new}, x_{new}) - k^T(x_{new}, X) K^{-1} k(x_{new}, X) \quad (18)$$

where $k(x_{new}, X) = [k(x_{new}, x_1), k(x_{new}, x_2), \ldots, k(x_{new}, x_n)]^T$. Finally, take the expectation $\mu(y_{new})$ of the posterior distribution as the prediction result about the output variable of the query data sample $x_{new}$.

Figure 4:
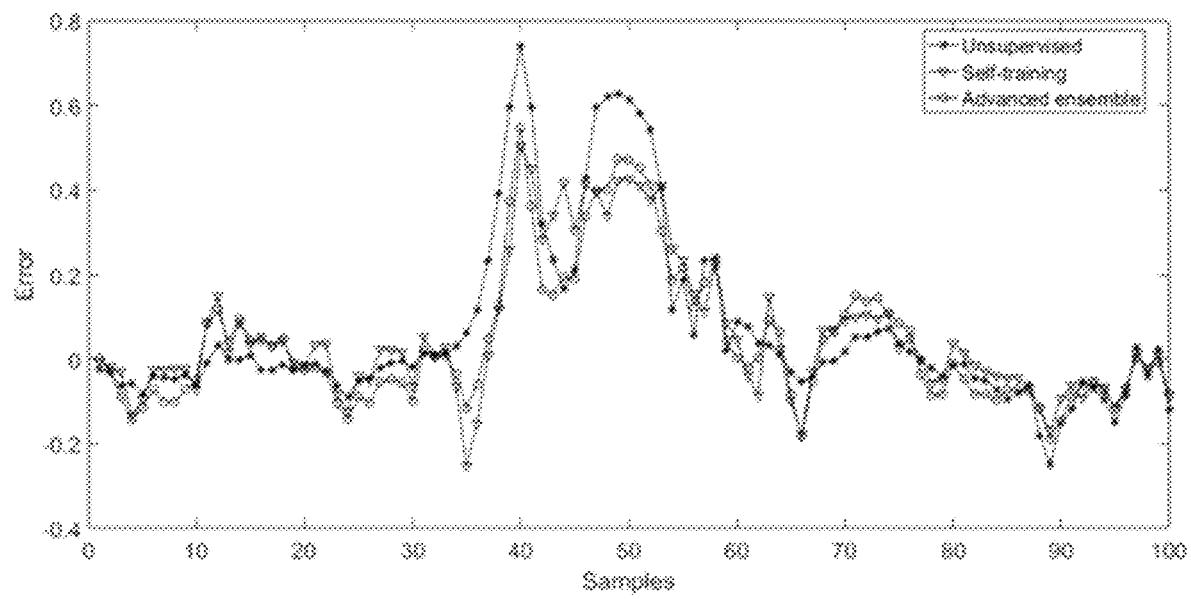
FIG. 4 shows the prediction errors under different modeling strategies.

FIG. 4 shows the prediction errors under different modeling strategies, it can be found that the advanced ensemble learning strategy based semi-supervised soft sensing method is superior to other strategies.

Figure 5:
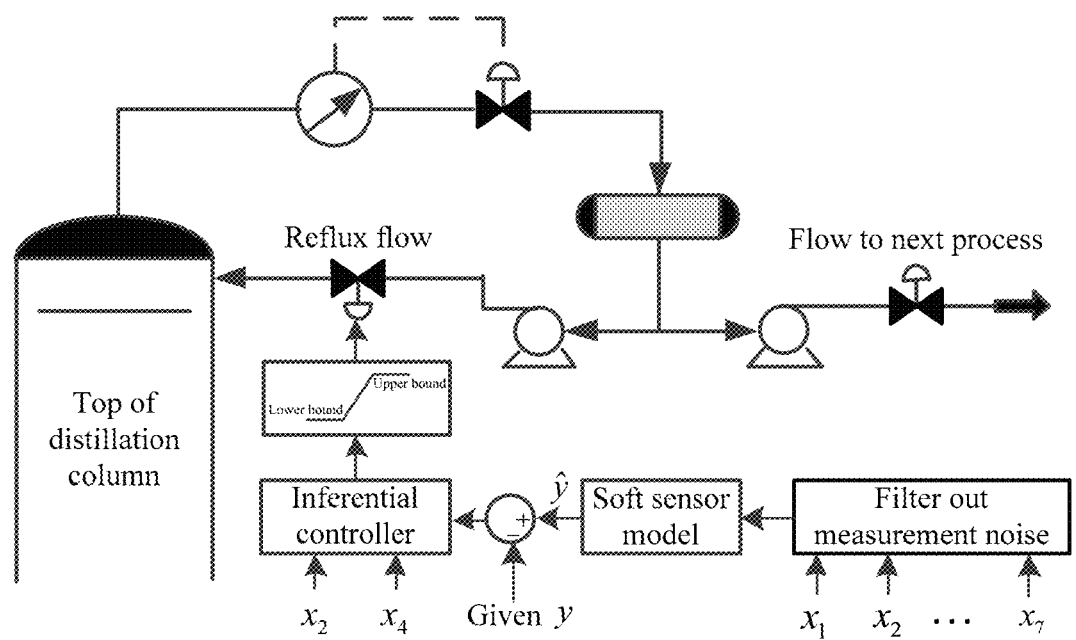
FIG. 5 shows the soft sensor based control strategy of the debutanizer column process.

The main operating variable affecting the product quality is the reflux flow $x_3$. Thus, a soft sensor based control strategy is designed to ensure the butane concentration of the product by manipulating the reflux rate. The close loop control scheme is shown in FIG. 5.

The signals of secondary variables are smoothed before sending into the soft sensor model. Furthermore, in order to make the control system ensure both the product quality and the material balance, the "expert control module" is applied in the inference control strategy. If the butane concentration is qualified, the reflux rate shall be adjusted according to $x_2$ and $x_4$; otherwise, the reflux rate shall be adjusted according to the deviation between the butane estimated value and the set value in the soft instrument. Finally, set the upper and lower bounds of the valve opening according to the control requirements of the distillation column.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   obtaining a labeled training set of vectors of process parameters of a debutanizer column process and labels respectively associated with the vectors of the labeled training set;
   obtaining an unlabeled training set of vectors of the processor parameters of the debutanizer column process;
   obtaining an estimated data set by labeling the vectors of the unlabeled training set utilizing a self-training method;
   selecting a subset of the estimated data set as a selected data set, based on the labeled training set and the unlabeled training set;
   obtaining subsets of the labeled training set and obtaining subsets of the selected data set, utilizing a bagging algorithm;
   pairing the subsets of the labeled training set and the subsets of the selected data set;
   calculating a butane content at a bottom of a debutanizer column used in the debutanizer column process, from a vector of the processor parameters of the debutanizer column process based on the paired subsets of the labeled training set and subsets of the selected data set; and
   adjusting the process parameters of the debutanizer column process based on the butane content;
   wherein the process parameters are selected from the group consisting of a temperature at a top of the debutanizer column, a pressure at the top of the debutanizer column, a reflux flow rate in the debutanizer column, a flow rate to a downstream process, tray temperatures and combinations thereof.

2. The method of claim 1, wherein adjusting the process parameters of the debutanizer column process based on the butane content comprises maximizing the butane content.

3. The method of claim 1, wherein selecting the subset of the estimated data set comprises:
   for each member of the estimated data set, calculating a sum of squares of differences between labels associated with the vectors of the labeled training set and a label of that member; and
   selecting the subset of the estimated data set in a matter that the sum calculated for any member of the subset of the estimated data set is not smaller than the sum calculated for any member of the estimated data set that is not of the subset of the estimated data set.

4. The method of claim 1, wherein obtaining the subsets of the labeled training set and obtaining the subsets of the selected data set comprise calculating a dissimilarity index for each pair of a member of the labeled training set and a member of the selected data set.

5. The method of claim 4, wherein pairing the subsets of the labeled training set and the subsets of the selected data set is based on the dissimilarity index.

\* \* \* \* \*